(12) United States Patent
Markovic

(10) Patent No.: US 7,969,604 B2
(45) Date of Patent: Jun. 28, 2011

(54) SYSTEMS AND METHODS FOR PRINTING ARTWORK CONTAINING TRANSPARENCY

(75) Inventor: Dejan Markovic, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1121 days.

(21) Appl. No.: 11/291,177

(22) Filed: Nov. 30, 2005

(65) Prior Publication Data

US 2007/0121160 A1    May 31, 2007

(51) Int. Cl.
  *G06K 15/00* (2006.01)
(52) U.S. Cl. .............. 358/1.16; 358/1.15; 358/1.17; 358/2.1
(58) Field of Classification Search ............. 358/1.9, 358/1.15, 2.1, 1.16, 1.17; 382/175, 176, 382/178, 195; 345/422, 426
See application file for complete search history.

(56) References Cited

U.S. PATENT DOCUMENTS

| | | | |
|---|---|---|---|
| 5,687,303 | A | 11/1997 | Motamed et al. |
| 5,854,882 | A | 12/1998 | Wang |
| 6,020,897 | A | 2/2000 | Carlsen et al. |
| 6,025,927 | A | 2/2000 | Honma |
| 6,049,339 | A * | 4/2000 | Schiller et al. ............ 345/630 |
| 6,230,174 | B1 | 5/2001 | Berger et al. |
| 6,313,847 | B1 | 11/2001 | Carlsen |
| 6,456,295 | B1 | 9/2002 | Schiller |
| 6,515,675 | B1 | 2/2003 | Bourdev |
| 6,678,072 | B1 | 1/2004 | Matsuoka et al. |
| 6,720,977 | B1 | 4/2004 | Bourdev |
| 7,583,410 | B1 | 9/2009 | Anup et al. |
| 2003/0174187 | A1 | 9/2003 | Greive |
| 2004/0086156 | A1 | 5/2004 | Furukawa et al. |
| 2004/0125404 | A1 | 7/2004 | Isshiki |
| 2004/0169889 | A1* | 9/2004 | Sawada .................... 358/2.1 |
| 2005/0083346 | A1 | 4/2005 | Takahashi et al. |
| 2007/0121131 | A1 | 5/2007 | Hauser |

FOREIGN PATENT DOCUMENTS

WO   WO-2007064851 A2   6/2007

(Continued)

OTHER PUBLICATIONS

"Application Serial No. PCT/US2006/045940, Int'l Preliminary Examination Report Mailed Oct. 22, 2009".

(Continued)

*Primary Examiner* — David K Moore
*Assistant Examiner* — Vu B Hang
(74) *Attorney, Agent, or Firm* — Schwegman, Lundberg & Woessner, P.A.

(57) ABSTRACT

Systems and methods provide a mechanism to print documents having transparent artwork that overlaps other artwork. One aspect of the systems and methods includes sending the document to a printer control system coupled to a printer. The printer control system detects overlapping areas, and processes the artwork into separate atomic regions. Objects contributing to the atomic region are placed in an object stack. A rasterizer having knowledge of the printer characteristics creates object raster buffers for the portions of the objects that contribute to the atomic region. The object raster buffers are then blended according to transparency values associated with the object to create an atomic region raster buffer. The atomic region raster buffer is combined with other atomic region raster buffers and raster images for other non-overlapping objects into a printer raster buffer that may be processed by the printer to produce a page.

21 Claims, 8 Drawing Sheets

FOREIGN PATENT DOCUMENTS

| | | |
|---|---|---|
| WO | WO-2007064851 A3 | 6/2007 |
| WO | WO-2007064915 A2 | 6/2007 |

OTHER PUBLICATIONS

"U.S. Appl. No. 11/304,321 Non-Final Office Action Mailed on Oct. 6, 2008", OARN, 7 Pgs.

"U.S. Appl. No. 11/304,321, Notice of Allowance mailed Apr. 30, 2009", 7 pgs.

"International Application No. PCT/US 06/45940, International Search Report Oct. 5, 2007", 4 pgs.

"International Application No. PCT/US 06/45940, Written Opinion Oct. 5, 2007", 7 pgs.

\* cited by examiner

SYSTEMS AND METHODS FOR PRINTING ARTWORK CONTAINING TRANSPARENCY

FIELD

The embodiments relate generally to processing electronic artwork, and more particularly to printing such artwork containing transparent elements.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

It is often desirable to include color artwork and text in documents. Color can make a document more interesting and more informative. In addition, many software applications that prepare documents and artwork provide many mechanisms to specify color and effects using color. These effects may include designating certain objects in the artwork as having varying degrees of transparency such that objects that are overlapped by another transparent object may still be at least partially visible.

Printers typically do not have the ability to natively process transparency, and the ability to define an object as transparent does not exist in most page description languages such as the PostScript® language. As a result, artwork containing transparency has to be converted to equivalent artwork not containing transparency before printing. In current systems, this conversion is typically done by a desktop application used to create the document. As a result, the conversion may take place without any knowledge of the capabilities of the printing device that will ultimately print the document. Thus the desktop application will generally attempt to emulate some of a printer's characteristics. If the document ends up being sent to a printer with differing characteristics, the resulting printed pages may be quite different from what the document creator desired.

SUMMARY

Systems and methods provide a mechanism to print documents having transparent artwork that overlaps other artwork. One aspect of the systems and methods includes sending the document to a printer control system coupled to a printer. The printer control system detects overlapping areas, and processes the artwork into separate atomic regions. Objects contributing to the atomic region are placed in an object stack. A rasterizer having knowledge of the printer characteristics creates object raster buffers for the portions of the objects that contribute to the atomic region. The object raster buffers are then blended according to transparency values associated with the object to create an atomic region raster buffer. The atomic region raster buffer is combined with other atomic region raster buffers and raster images for other non-overlapping objects into a printer raster buffer that may be processed by the printer to produce a page.

The specification describes systems, methods, and computer-readable media of varying scope. In addition to the aspects and advantages described in this summary, further aspects and advantages of the embodiments of the invention will become apparent by reference to the drawings and by reading the detailed description that follows.

DETAILED DESCRIPTION

Figure 1:
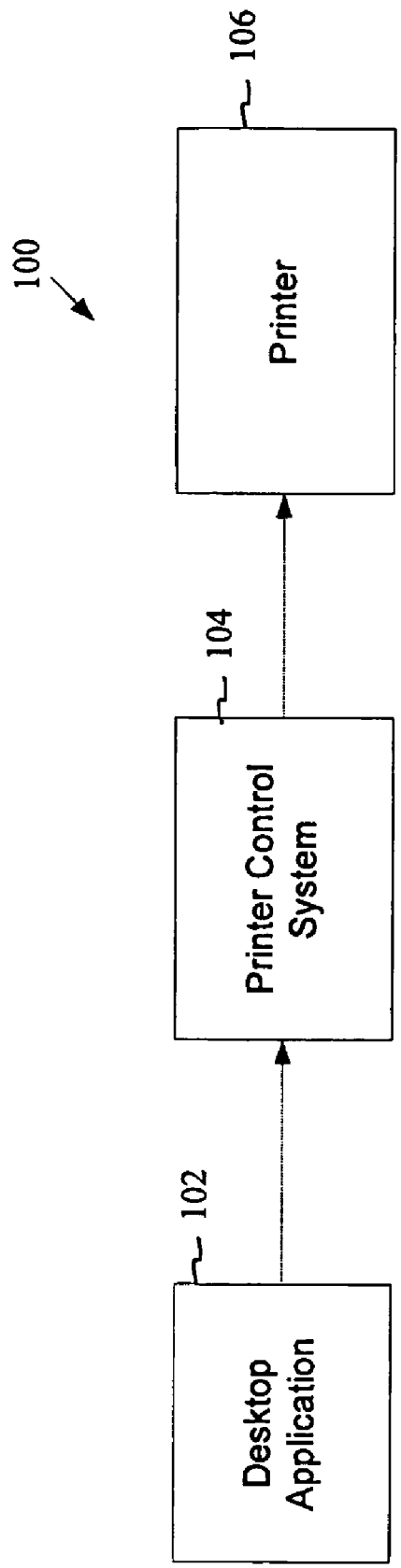
FIG. 1 is a block diagram illustrating an example environment in which embodiments of the invention may be practiced.

In the following detailed description of example embodiments, reference is made to the accompanying drawings which form a part hereof, and in which is shown by way of illustration specific example embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the detailed description.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating example elements of a printing workflow 100 incorporating embodiments of the invention. In the example shown, the workflow 100 includes a desktop application 102, a first printer control system 104, and a printer 106.

Desktop application 102 comprises an application that provides a mechanism for a user to design the layout of a document containing various forms of print objects. The print objects may include varying combinations of text, graphics and/or images (e.g. artwork). The desktop application 102 will typically provide a way for a user to control the size, position, and orientation of the print objects in the document. As a result of the placement of print objects in the file, some portions of one print object may overlap other portions of another print object. Examples of such desktop applications include the Adobe Acrobats family of document processing applications, InDesign®, Photoshop®, Creative Suite®, Illustrator®, FrameMaker® and PageMaker® applications, all available from Adobe Systems Inc. of San Jose, Calif. However, the embodiments are not limited to any particular document creation application and in alternative embodiments the document creation application may be any word processing application, image processing application, or other application that operates on electronic text and images. As an example, desktop application 102 may comprise the Microsoft Publisher application available from Microsoft Corporation of Redmond, Wash.

Some current desktop applications can attempt to handle transparent objects internally. Generally, there are two ways to process transparent artwork: without preprocessing and with preprocessing. If the artwork is not preprocessed to determine the extent of the transparency, an contone raster buffer for the page (or surface) needs to be kept for blending. Further, processing of nested transparency groups can add many layers of raster buffers necessary for processing. As a result, the memory resources required by the desktop application can be prohibitive in all but simple cases. As a result, a typical transparency processing solution includes some kind of preprocessing of transparent artwork.

There are several problems with converting transparency in a preprocessing step performed by a desktop application:
  the results of preprocessing are dependent on the assumption of which printing device will be used, so last minute change can result in artifacts, lower quality, or suboptimal processing times—or preprocessing steps have to be performed.
  some widely used prepress mechanisms, such as OPI (Open Press Interface), cannot be used with transparent artwork, because transparency preprocessing needs to deal with actual image data which will be rendered, not the reduced resolution substitute that is typically used by the prepress mechanism.
  the rasterizing engine used within a desktop application for computing color of image pixels typically has different characteristics than the rasterizing engine used for printing the artwork, which can lead to artifacts and color mismatches.
  currently, configuring a desktop application rasterizer to high resolutions typically used in printing devices can lead to severe performance problems both during preprocessing operations performed by the desktop application 102 and during printing the results of the preprocessing.

Thus in various embodiments, a printer control system 104 processes transparency. Printer control system 104 includes hardware and software that provides front-end processing of files to be printed on printer 106. Printer control system 104 receives one or more files from desktop application 102 over a network or other communications interface (not shown), processes the file, and then sends the processed data to be printed on printer 106. Printer control system 104 may be a separate workstation that is communicably coupled to printer 106, or it may be integrated within printer 106. Further details on printer control system 104 are provided below with reference to FIG. 2.

Printer 106 receives data processed by printer control system 104 and provides printed copies of the file or files sent to printer control system 104 by desktop application 102. Printer 106 may be an inkjet printer, a laser printer, an offset printer, or any other type of printer known in the art. Additionally, printer 106 may be a continuous-tone or "contone" printer. Continuous-tone printers can print each dot using enough different shades of lightness and darkness (typically 256 or more) so that the difference between one shade and the next is imperceptible to the human eye.

Alternatively printer 106 may be what will be referred to as a multi-level or halftone printer. A multi-level printer uses a combination of halftoning and printing at different levels of intensity to produce different colors and different shades of colors or lightness and darkness. Unlike a true continuous-tone printer, multi-level printers can lay down at ink at only a few different levels of intensity, typically two, four or sixteen intensity levels. To produce the full range of colors that can be perceived by the human eye, multi-level printers typically use halftoning techniques. In halftoning, the perception of new colors and shades is created by varying a pattern of dots in a cell. The denser the pattern of dots in the cell, the darker the shade of color. The more halftone patterns that a printer supports, the more shades of color it can represent.

Figure 2:
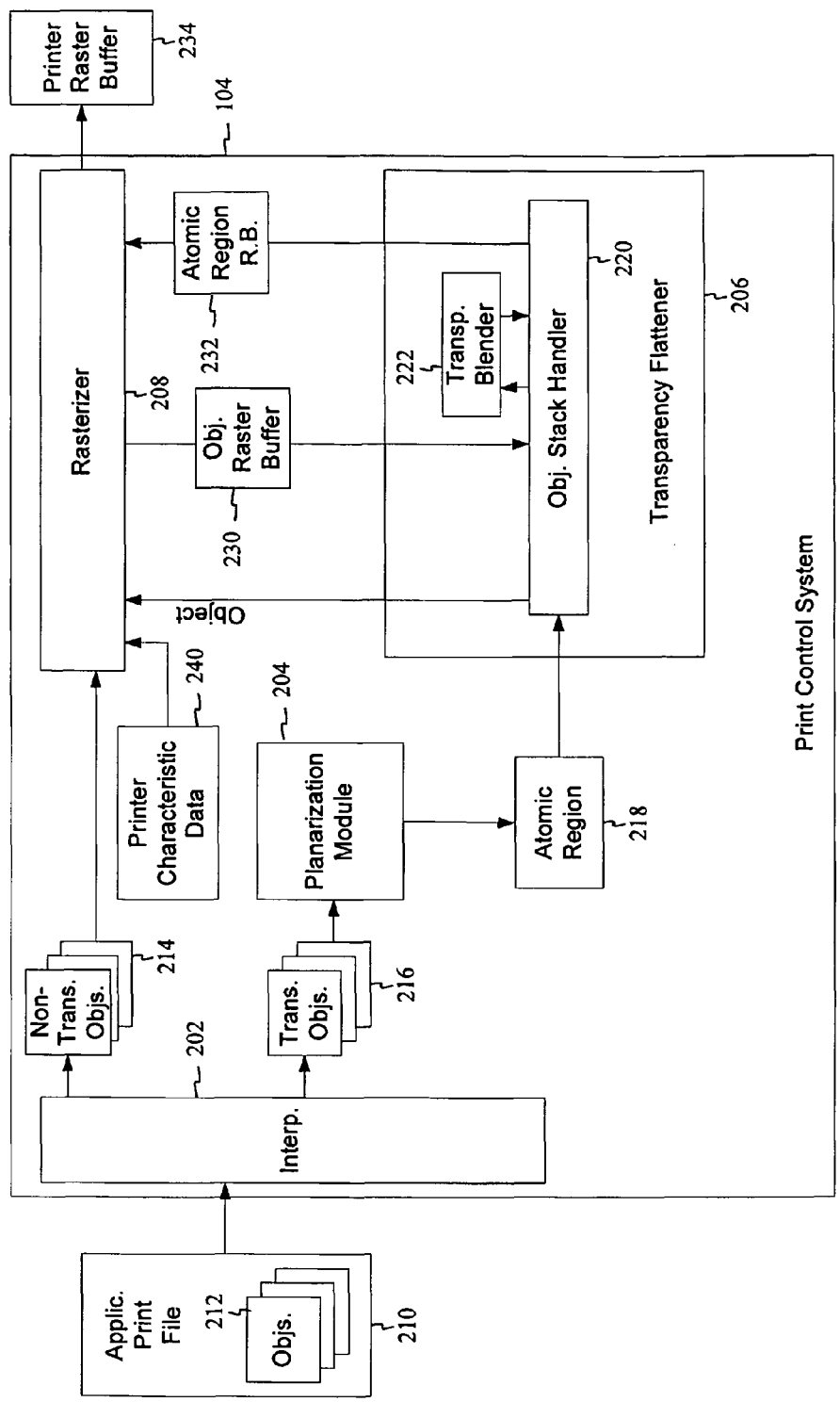
FIG. 2 is a block diagram illustrating major logical components of a printing system according to example embodiments of the invention.

FIG. 2 is a block diagram illustrating major components of a printer control system 104 according to an example embodiment. In an example embodiment, printer control system 104 includes interpreter 202, planarization module 204, transparency flattener 206 and rasterizer 208. Printer control system 104 receives an application print file 210 from desktop application 102 (FIG. 1). Application print file 210 defines one or more pages to be printed by printer 106. The application print file 210 may contain one or more print objects 212 that are to be printed on the one or more pages. Print objects 212 include data defining how and where the object is to appear on a page. Print objects 212 may include raster image objects or analytical objects. A raster image object is an object defined using raster image data. An analytical object includes a set of vectors defining a boundary for an area on a page that is to be printed. The analytical object may have other data regarding the area such as the color, shading, texture effects, or other aspect regarding printing the area. Either type of object may have data defining the transparency and blending mode of the object.

Print objects 212 may be positioned so that they overlap all or part of other print objects. Additionally, an arbitrary number print objects may overlap one another.

Application print file 210 is provided in a format allowing the various data defining the print objects 212 to be communicated to printer control system 104. Examples of such data include varying combinations of color, transparency, blending mode, position, size, resolution etc.

Interpreter 202 is configured to read and parse an application print file 210, including the print objects 212 present in each application print file 210. In addition interpreter 202 determines where print objects 212 are to be further processed. In an example embodiment, interpreter 202 determines whether a print object is a non-transparency interacting object 214, or a transparency interacting object 216. A non-transparency interacting object 214 may be an opaque object that does not interact with another object, e.g. it is not transparent and does not overlap and is not overlapped by another object.

A transparency interacting object 216 is an object that is either transparent itself or interacts with another object, and where at least one of the interacting objects is transparent. Typically, the interaction is caused by the fact that a transparent object overlaps one or more other objects, which themselves may be transparent and overlap other objects.

Transparency interacting objects 216 are sent by interpreter 202 to planarization module 204. Planarization module 204 determines where the objects are positioned, the area the objects cover, and where the objects overlap. A set of objects that overlap form an overlapping region. Based on this determination, planarization module 204 divides the transparency interacting objects in the overlapping region into one or more atomic regions. An atomic region 218 comprises a region created from the overlapping objects in which the boundaries are determined by the intersections of the overlapping objects. Further, an atomic region 218 is one in which the same set of objects intersect over the entire area of the atomic region. Thus an atomic region 218 is one which does not overlap any other atomic region. Planarization module 204 determines the boundaries of the one or more atomic regions 218 and also maintains data indicating which transparency interacting objects are contributing data for the region. An atomic region 218 may include objects that are defined as raster images, or as vector defined areas, or a combination of both raster images and vector defined areas.

Figure 3A:
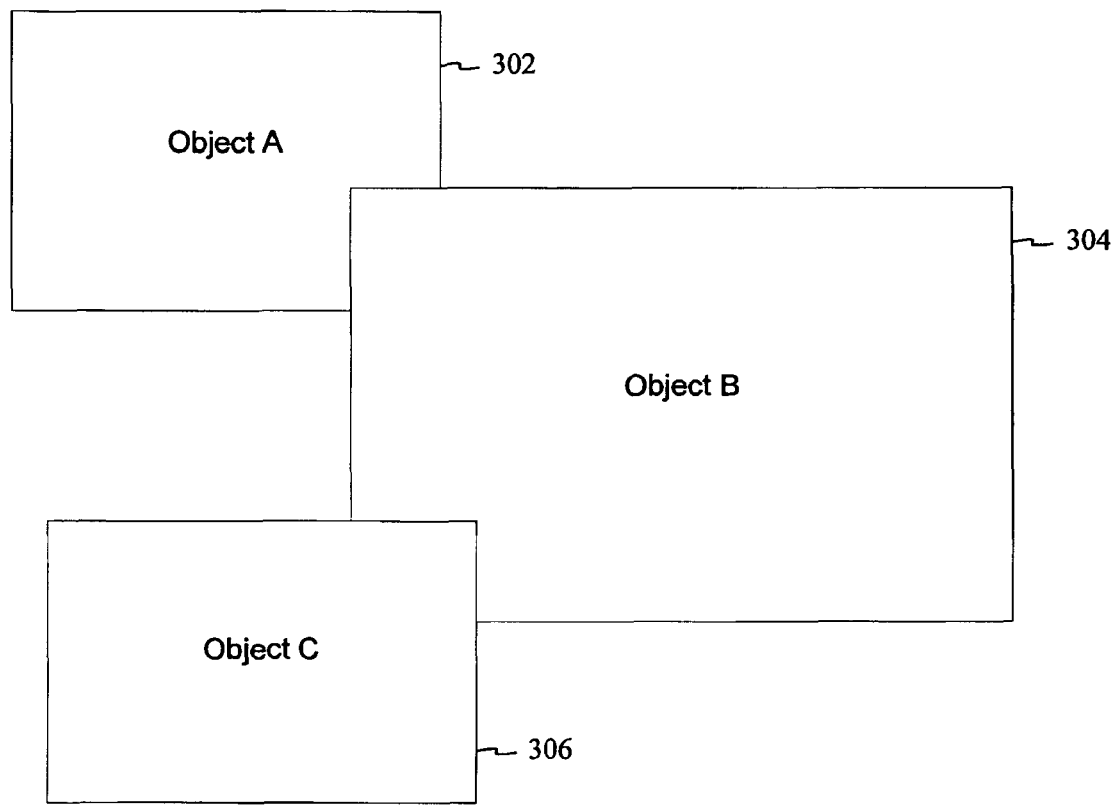
FIG. 3A-3C are block diagrams illustrating creation of an atomic region from a plurality of overlapping print objects according to an example embodiment.
Figure 3B:
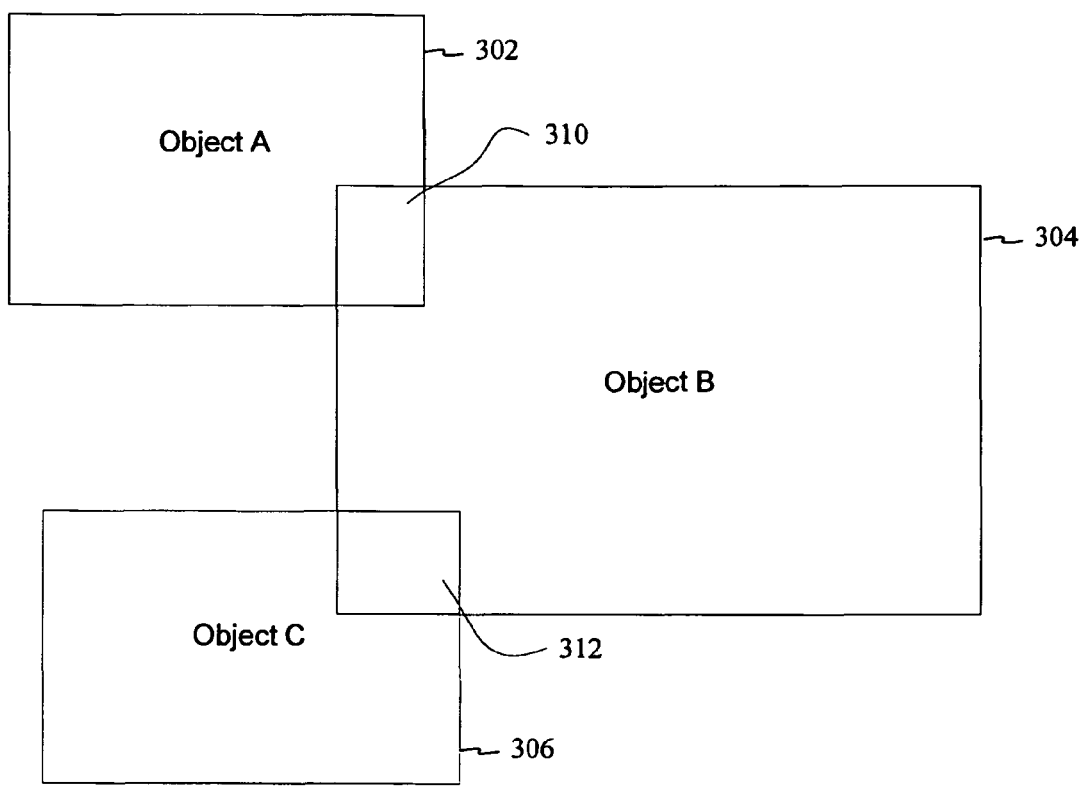
Figure 3C:
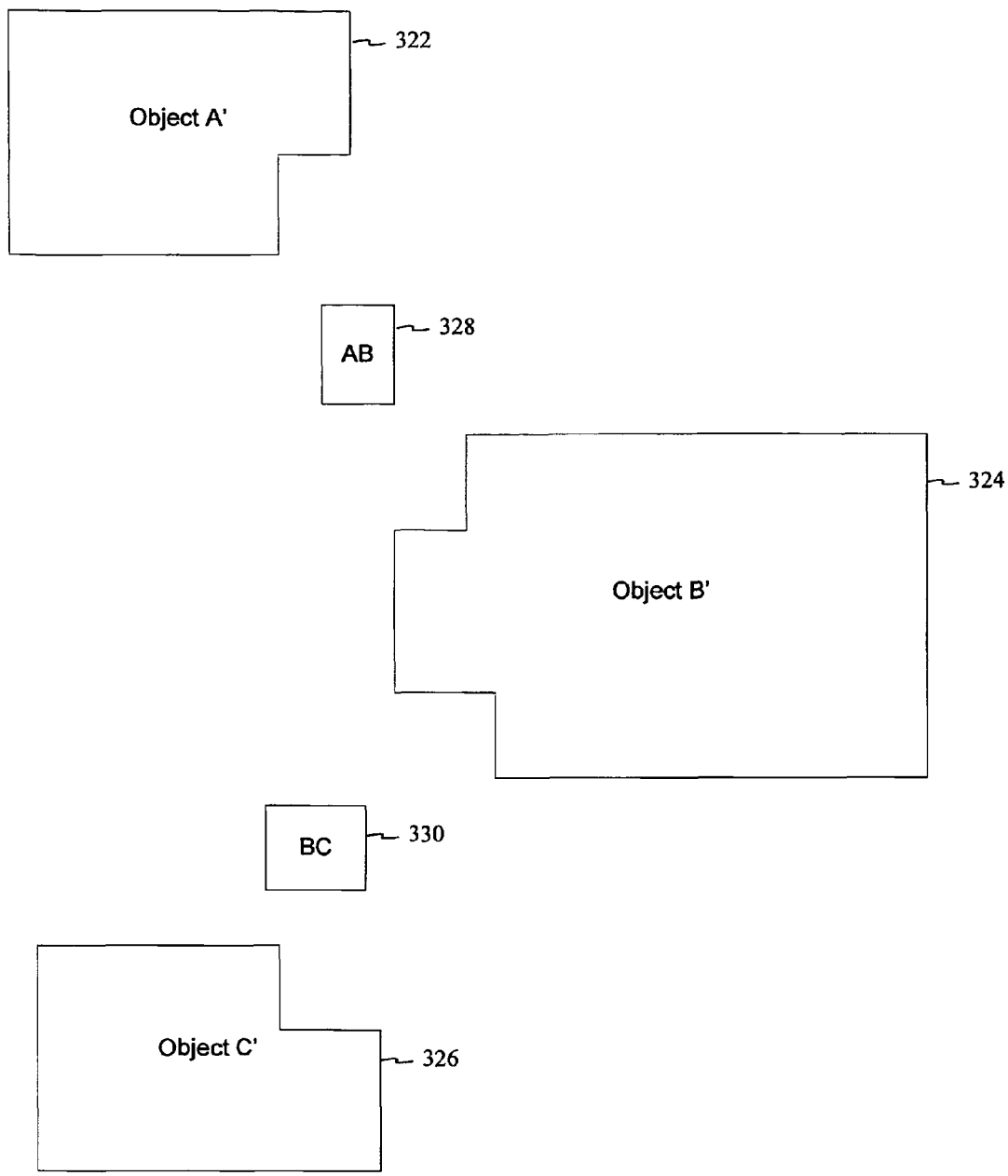

FIGS. 3A-3C provide an example of the creation of atomic regions 218 by planarization module 204. FIG. 3A represent three individual artwork objects, object A 302, object B 304 and object C 306. Note that object C overlaps object B, and object B in turn overlaps object A. Planarization module 204 identifies the overlapping regions, which are identified in FIG. 3B as regions 310 and 312.

FIG. 3C illustrates the final determination of atomic regions 218 of planarization module 204 with respect to example objects A, B and C. As illustrated, planarization module 204 creates five atomic regions from the initially received three objects. In the example, atomic region A' 322 represents object A with the overlap region 310 removed, atomic region B' 324 represents object B with the overlapping regions 310 and 312 removed, atomic region C' 326 represents object C with the overlapping region 312 removed, atomic region AB 328 represents the overlapping region 310 in which objects A and B contribute data; and atomic region BC represents the overlapping region 312 in which objects B and C contribute image data. Note that the regions in FIG. 3C are shown separated in space to better indicate there respective edges. In actuality, the objects would maintain the positions as illustrated in FIGS. 3A and 3B.

Those of skill in the art will appreciate that the example shown in FIGS. 3A-3C is just one example of a combination of objects and overlap characteristics. Multiple objects may overlap one another and the objects may have varying shapes and sizes thereby leading to an endless variety of combinations of objects and overlap areas.

Returning to FIG. 2, transparency flattener 206 receives the atomic regions 218 created by planarization module 204 and proceeds to process the atomic regions 218 so that each atomic region is converted from a region containing data for multiple objects, some or all of which include transparency levels, to an opaque region having color values the reflect the color blending of the objects in the atomic region. The colors for a particular region will depend on the colors of the objects that overlap and the degree of transparency of the overlapping object within the atomic region 218. In addition, a blending mode may affect the color for an atomic region 218. In an example embodiment, transparency flattener 206 includes an object stack handler 220 and transparency blender 222.

Object stack handler 220 manages the submission of objects in an atomic region 218 to rasterizer 208 and transparency blender 222. In an example embodiment, an object stack is an ordering of objects in an atomic region 218 where the order of the objects is determined by the order in which the objects are drawn on a page. In some embodiments, objects that are to be drawn first are on the bottom of the stack while the object drawn last is at the top of the stack. Objects in the atomic region 218 are passed to rasterizer 208 by object stack handler 220.

Rasterizer 208 receives an object and converts it to an object raster buffer 230 associated with the object. In an example embodiment, the object raster buffer 230 is a memory data structure containing pixel data for the object. However, alternative formats for the memory data structure are possible and within the scope of the inventive subject matter. In order to assist in the object conversion, rasterizer 208 may have access to printer characteristic data 240. Printer characteristic data 240 includes data defining various operating characteristic of a printer 106 coupled to printer control system 104. These characteristics include printer resolution, printer type (contone or continuous tone, laser, inkjet etc.), printer color profile and other characteristics. Printer characteristic data 240 may be read from a configuration file, read from printer 106 directly, or be compiled into the software for printer control system 104.

The amount of conversion necessary may depend on the type of object received. For example, for an object with boundaries defined as an area enclosed by vectors with a color and/or shading mode defined, rasterizer 208 will need to determine the pixels in the object raster buffer 230 that are included in the area bound by the atomic region, and determine a color setting for each pixel based on the color of the object and/or shading mode specified for the object. For an object that is already defined as a raster image, the rasterizer 208 may still need to convert the raster image object to an object raster buffer 230. This is because the resolution of the incoming object may be different than the resolution supported by the printer. Thus in cases where the object resolution is greater than the printer resolution, the object raster data may need to be sampled and the sampling points placed in the object raster buffer 230. In an example embodiment, if the object resolution is less than the printer resolution, the output pixels which correspond to the same image sample placed in the object raster buffer 230 using the color of the image sample. In an alternative embodiment, the object raster data may be interpolated and placed in the object raster buffer 230. If the image resolution and the printer resolution are the same, no conversion may be necessary.

The object raster buffers 230 associated with the objects in the atomic region 218 are then blended by transparency blender 222. In an example embodiment, transparency blender 222 blends the object raster buffers 230 according to the transparency mode for the object associated with object raster buffer 230. The transparency mode may indicate how colors show through the transparent portion or the degree to which colors are combined in the transparent portion. The transparency blender 222 builds an overlapping region memory data structure representing the blending of the print objects in an overlapping region. In an example embodiment, the overlapping region memory data structure comprises an atomic region raster buffer 232 which represents the blending of all of the objects for an atomic region 218. In an example embodiment, the atomic region raster buffer 232 is a memory data structure containing pixel data for the atomic region. However, alternative formats for the memory data structure are possible and within the scope of the inventive subject matter.

Rasterizer 208 receives the atomic region raster buffer 232, and positions the atomic region raster buffer 232 in the printer raster buffer 234, according to the position of the atomic region on the output page. After all objects have been placed in the printer raster buffer 234, the printer raster buffer 234 may be sent to printer 106 to be printed. Printer raster buffer 234 is a memory data structure that represents an image to be sent to a printer 106. In some embodiments, the memory data structure contains pixel data to be sent to the printer. However, alternative formats for the memory data structure are possible and within the scope of the inventive subject matter.

Non-transparency interacting objects 214 may be sent directly to the rasterizer 208 by interpreter 202 for placement in printer raster buffer 234.

Figure 4A:
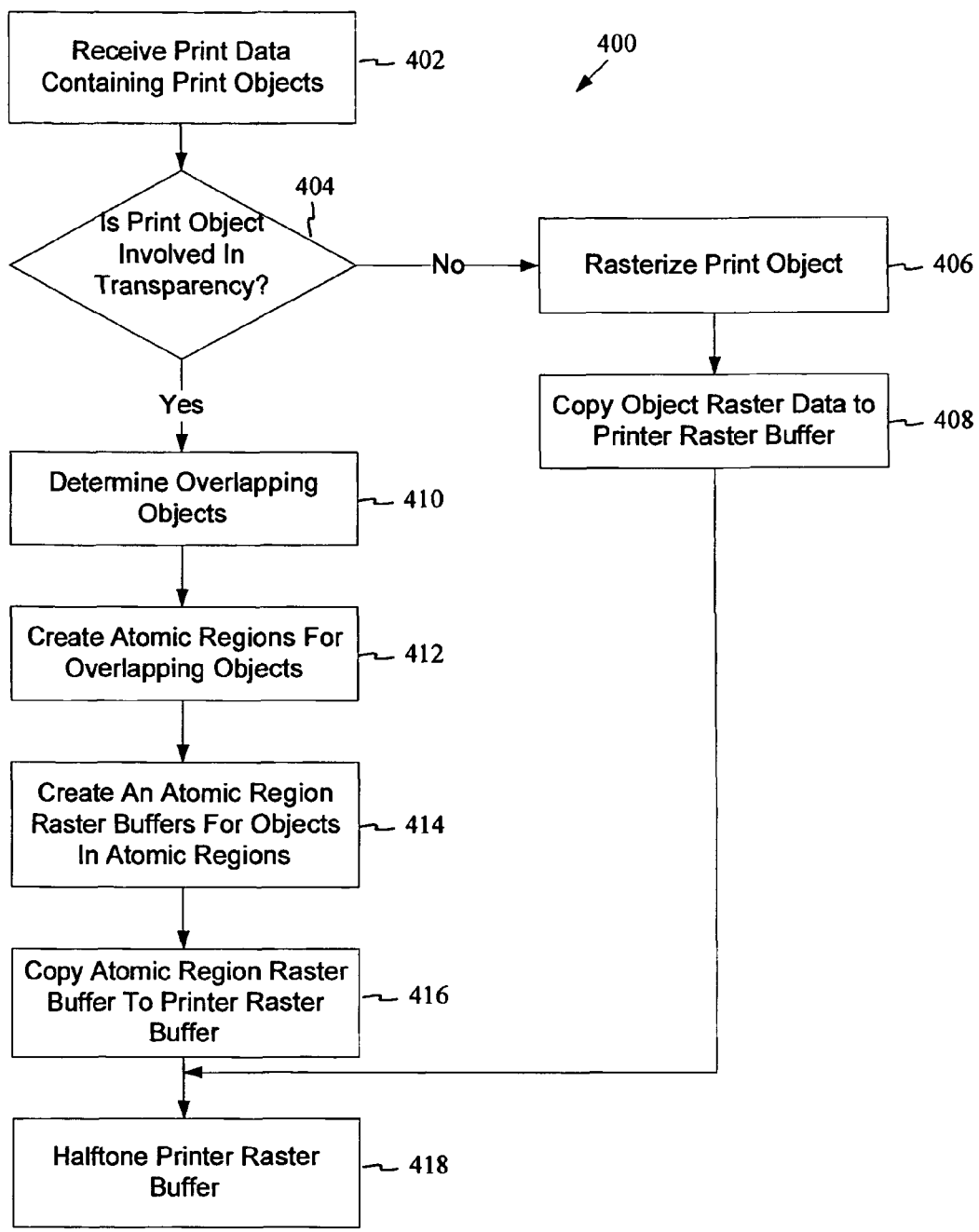
FIGS. 4A and 4B are flowcharts illustrating methods for printing artwork having transparent objects that overlap other objects according to an example embodiment.

Further details on the operation of the printer control system 104 are provided below with reference to FIGS. 4A and 4B. FIG. 4A is a flowchart illustrating a method for printing artwork containing overlapping inks according to an example embodiment. The method begins by a printer control system 104 receiving print data containing a plurality of print objects (block 402). In some embodiments, the print data is contained in a file that is sent to the printer control system. In alternative embodiments, the print data may be part of a stream of data sent over a network to a printer control system. Included in a print object is data defining the shape, position, and transparency of the print object. In an example embodiment, an interpreter 202 receives the print data and parses the print data to determine what is to be printed. The interpreter 202 is thus designed with knowledge of the format of the incoming print data.

In an example embodiment, interpreter 202 determines if a print object is involved in a transparency (decision block 404). A print object is involved in a transparency if it overlaps another object and is defined as transparent. If the print object is not involved in a transparency, it may be sent to a rasterizer 208 to be converted to a raster image (block 406). The raster image data for the object may then be copied to a printer raster buffer that will eventually comprise the image to be sent to the printer (block 408).

If the print object is involved with a transparency, then the interpreter 202 determines other overlapping objects involved in the transparency (block 410). The objects involved in the transparency will generally include an overlapped object and one or more overlapping objects that are defined with some degree of transparency and an optional transparency blending mode.

The objects are then sent to a planarization module 204, which creates one or more atomic regions from the objects (block 412). As discussed above, an atomic region is a region created from the overlapping objects in which the boundaries are determined by the intersections of the overlapping objects. An atomic region is one in which the same set of objects intersect over the entire area of the atomic region. The overlapping objects in an atomic region may be arranged in an object stack that reflects the order of the overlapping objects (e.g., from bottom to top). Further, the overlapping objects may be composed of raster image objects, analytical objects or a combination of the two. Multiple atomic regions will typically be created for a given set of overlapping objects.

A transparency flattener 206 creates an atomic region raster buffer for each atomic region (block 414). The atomic region raster buffer comprises raster image data representing the blending of the objects in the object stack within the atomic region, taking into account the transparency and blending mode of each object. Further details on creating an atomic region raster buffer are provided below with reference to FIG. 4B.

After an atomic region raster buffer has been created, it is copied into a printer raster buffer (block 416). In some embodiments, a rasterizer 208 receives the atomic region raster buffer and copies it to the appropriate position in the printer raster buffer. The appropriate position is determined by the position of the atomic region on the page to be printed.

In some embodiments, if the printer is a multi-level printer, the rasterizer may halftone the printer raster buffer after all printer objects have been processed (block 418). As noted above, halftoning is the process of creating patterns of dots in the raster buffer. The patterns define varying shades of a color or gray scale image, with denser patterns reflecting a darker shade and less dense patterns reflecting a lighter shade.

Figure 4B:
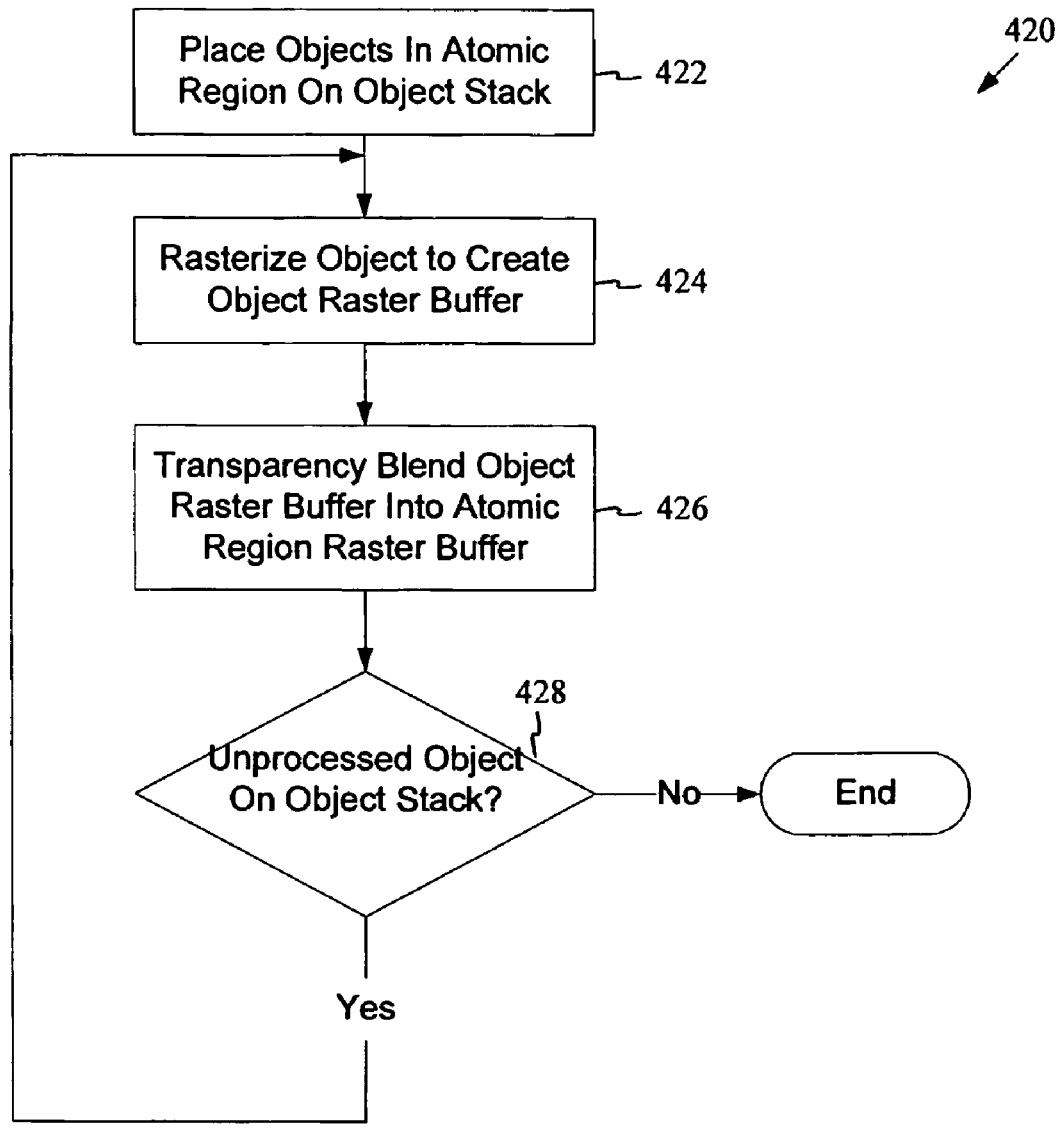

FIG. 4B is a flowchart illustrating a method 420 for creating an atomic region raster buffer according to an example embodiment. The method begins by an object stack handler placing print objects for an atomic region on an object stack (block 422). The object stack handler then processes each object in the stack.

An object on the stack is rasterized to create an object raster buffer (block 424). The object raster buffer comprises a raster image of the area of the object that lies within the atomic region. In some embodiments, rasterizer 208 is used to rasterize the object. This is desirable, because rasterizer 208 has knowledge of the printer characteristics and can thus accurately rasterize the object data.

Next, the object stack handler transparency blends the object raster image into the current state of an atomic region raster buffer. In some embodiments, a transparency blender 222 blends the object raster buffer according to the transparency level and blending mode associated with the objects associated with the object raster images (block 426). The transparency level defines the degree of transparency, ranging from opaque to totally clear. The blending mode defines how the object is to be blended with data from other objects. Blend modes are typically described in terms of a backdrop color and a source color, where the source color is applied over the backdrop color using a method specified by the blending mode. Various blending modes may be specified. In an example embodiment, the blending modes include the modes specified in Table 1 below.

TABLE 1

| Mode | Description |
| --- | --- |
| Normal | Selects the source color, ignoring the backdrop: |
| Multiply | Multiplies the backdrop and source color values. The result color is always at least as dark as either of the two constituent colors. Multiplying any color with black produces black; multiplying with white leaves |

TABLE 1-continued

| Mode | Description |
|---|---|
| | the original color unchanged. Painting successive overlapping objects with a color other than black or white produces progressively darker colors. |
| Screen | Multiplies the complements of the backdrop and source color values, then complements the result. The result color is always at least as light as either of the two constituent colors. Screening any color with white produces white; screening with black leaves the original color unchanged. The effect is similar to projecting multiple photographic slides simultaneously onto a single screen. |
| Overlay | Multiplies or screens the colors, depending on the backdrop color. Source colors overlay the backdrop while preserving its highlights and shadows. The backdrop color is not replaced but is mixed with the source color to reflect the lightness or darkness of the backdrop. |
| Darken | Selects the darker of the backdrop and source colors. The backdrop is replaced with the source where the source is darker; otherwise, it is left unchanged. |
| Lighten | Selects the lighter of the backdrop and source colors. The backdrop is replaced with the source where the source is lighter; otherwise, it is left unchanged. |
| ColorDodge | Brightens the backdrop color to reflect the source color. Painting with black produces no change. |
| ColorBurn | Darkens the backdrop color to reflect the source color. Painting with white produces no change. |
| HardLight | Multiplies or screens the colors, depending on the source color value. If the source color is lighter than 0.5, the backdrop is lightened as if it were screened; this is useful for adding highlights to a scene. If the source color is darker than 0.5, the backdrop is darkened as if it were multiplied; this is useful for adding shadows to a scene. The degree of lightening or darkening is proportional to the difference between the source color and 0.5; if it is equal to 0.5, the backdrop is unchanged. Painting with pure black or white produces pure black or white. The effect is similar to shining a harsh spotlight on the backdrop. |
| SoftLight | Darkens or lightens the colors, depending on the source color value. If the source color is lighter than 0.5, the backdrop is lightened as if it were dodged; this is useful for adding highlights to a scene. If the source color is darker than 0.5, the backdrop is darkened as if it were burned in. The degree of lightening or darkening is proportional to the difference between the source color and 0.5; if it is equal to 0.5, the backdrop is unchanged. Painting with pure black or white produces a distinctly darker or lighter area but does not result in pure black or white. The effect is similar to shining a diffused spotlight on the backdrop. |
| Difference | Subtracts the darker of the two constituent colors from the lighter color. Painting with white inverts the backdrop color; painting with black produces no change. |
| Exclusion | Produces an effect similar to that of the Difference mode but lower in contrast. Painting with white inverts the backdrop color; painting with black produces no change. |

In some embodiments, the atomic region raster buffer may be compressed. Compression is desirable, because a large number of atomic region raster buffers may be created and held for later placement in the printer raster buffer. Compression reduces the memory requirements of the printer control system 104.

The object stack handler then checks to see of any objects remain in the object stack (block 426). If objects remain, then the method returns to block 424 to create an object raster buffer for the object. Otherwise the atomic region raster buffer is complete and the method terminates.

Figure 5:
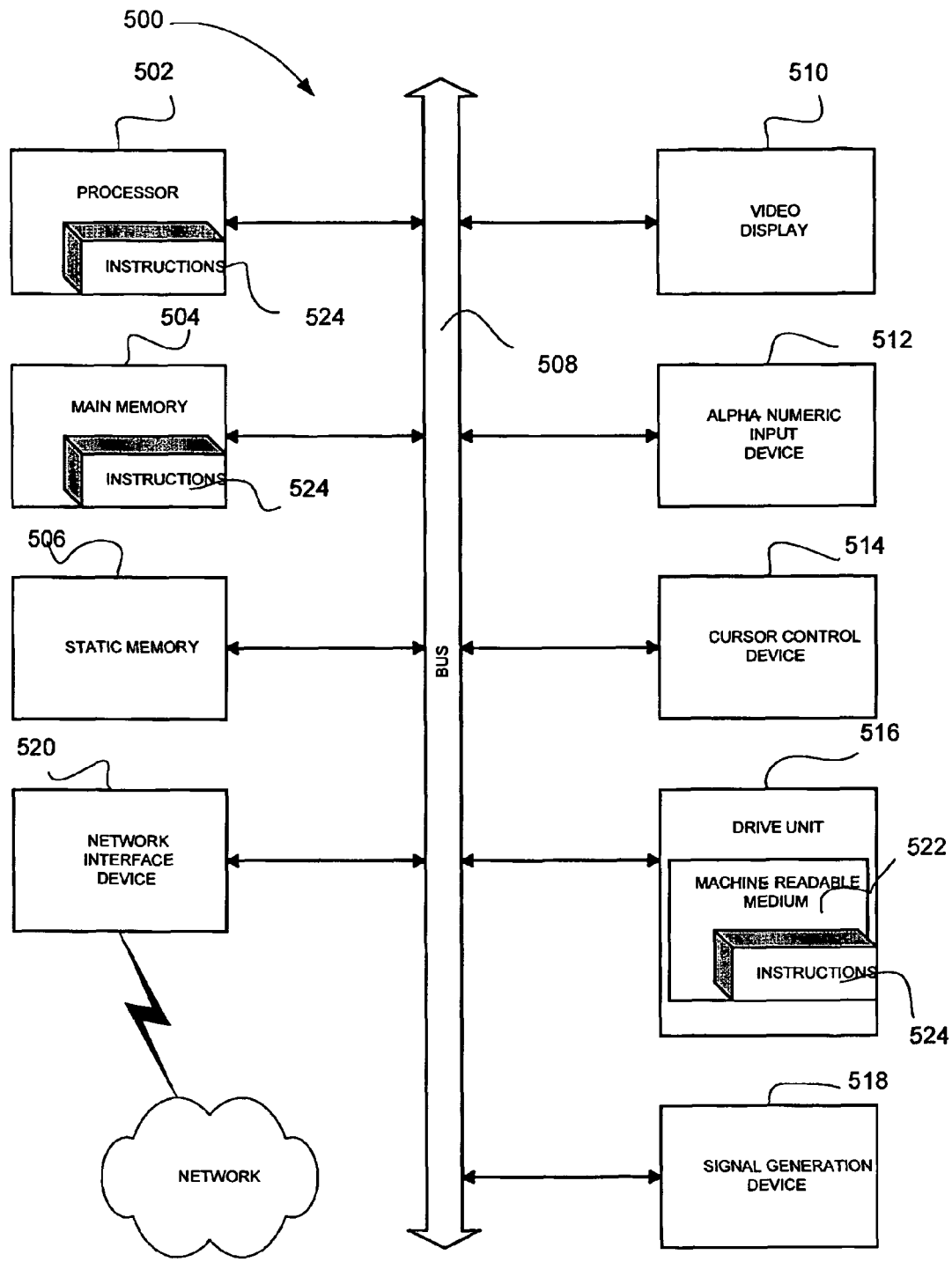
FIG. 5 is a block diagram illustrating components of a computing device that may execute systems and methods according to embodiments of the invention.

FIG. 5 is a block diagram illustrating major components of a computer system 500 within which a set of instructions, for causing a printer control system 104 to perform any one or more of the methodologies discussed herein, may be executed. In alternative embodiments, the machines operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an embedded controller, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520. The network 526 may be any type of wired or wireless network and the network interface 520 may vary based on the type of network. In some embodiments, the network comprises a LAN (local area network). In alternative embodiments, the network may be a wide area network, a corporate network, or an intranet linking multiple networks. In further alternative embodiments, the network may comprise the Internet.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals, including optical and electromagnetic signals.

Systems and methods to print documents having overlapping transparent artwork have been described. Although the present invention has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope or meaning of the claims.

What is claimed is:

1. A method comprising:
in a printer control system:
receiving print data defining a plurality of print objects, the print objects each having a transparency value;
determining a plurality of overlapping transparency interacting objects from the plurality of print objects;
determining an overlapping region from the plurality of overlapping transparency interacting objects;
reading printer characteristic data comprising data defining an operating characteristic of a printer;
creating a plurality of object raster buffers by rasterizing, using the printer characteristic data, the overlapping region of each overlapping transparency interacting object creating an object raster buffer associated with the respective overlapping transparency interacting object;
subsequent to the creating of the plurality of object raster buffers, blending the plurality of object raster buffers into an overlapping region memory data structure; and
placing the overlapping region memory data structure into a printer memory data structure.

2. The method of claim 1, wherein the overlapping region comprises an atomic region having boundaries determined by intersections of the overlapping transparency interacting objects.

3. The method of claim 1, wherein the overlapping region memory data structure comprises an atomic region raster buffer.

4. The method of claim 3, further comprising creating an object raster buffer for each of the overlapping transparency interacting objects.

5. The method of claim 1, wherein blending the object raster buffer for each of the overlapping transparent objects includes determining a blending mode for each of the overlapping transparency interacting objects.

6. The method of claim 1, further comprising compressing the overlapping region memory data structure and wherein placing the overlapping region memory data structure into the printer memory data structure includes decompressing the overlapping region memory data structure.

7. The method of claim 1, wherein the printer memory data structure comprises a printer raster buffer and further comprising halftoning the printer raster buffer.

8. The method of claim 1,
wherein the printer characteristic data comprises at least one of a printer resolution, a printer type, or a printer color profile.

9. The method of claim 1, wherein the printer configuration data is read from a printer configuration file.

10. A system comprising:
a printer; and
a printer control system coupled to the printer, the printer control system including:
an interpreter to:
receive an application print file having a plurality of print objects; and
determine a set of overlapping objects for the print objects;
a planarization module operable to create one or more overlapping regions from the overlapping objects;
a rasterizer to
access printer characteristic data, and
create a plurality of object raster buffers by rasterizing, using the printer characteristic data, the one or more overlapping regions of each of the overlapping objects; and
a transparency blender to blend the plurality of object raster buffers created by the rasterizer into an overlapping region memory data structure;
wherein the rasterizer is operable to position the overlapping region memory data structure in a printer memory data structure.

11. The system of claim 10, wherein the overlapping region comprises an atomic region having boundaries determined by intersections of the overlapping objects.

12. The system of claim 11, wherein the overlapping region memory data structure comprises an atomic region raster buffer.

13. The system of claim 10, wherein the transparency flattener includes an object stack handler to order processing of the overlapping objects.

14. The system of claim 10, wherein the transparency blender blends the plurality of object raster buffers according to blending modes defined for the print objects associated with the object raster buffers.

15. The system of claim 10, wherein the print objects include raster image objects.

16. The system of claim 10, wherein the print objects include analytical objects.

17. The system of claim 10, wherein the printer characteristic data comprises at least one of a printer resolution, a printer type, or a printer color profile.

18. The system of claim 10, wherein the printer characteristic data is read from a printer configuration file.

19. The system of claim 10, wherein the interpreter causes the rasterizer to rasterize a non-transparency involved print object.

20. A non-transitory machine-readable medium embodying a set of instructions that, when executed by a machine, cause the machine to perform a method comprising:
in a printer control system:
receiving print data defining a plurality of print objects, the print objects each having a transparency value;
determining a plurality of overlapping transparency objects from the plurality of print objects;
determining an overlapping region from the plurality of overlapping transparency objects;
reading printer characteristic data comprising data defining operating characteristics of a printer;
creating a plurality of object raster buffers by rasterizing, using the printer characteristic data, the overlapping region of each overlapping transparency interacting object creating an object raster buffer associated with the respective overlapping transparency interacting object;
subsequent to the creating of the plurality of object raster buffers, blending the plurality of object raster buffers into an overlapping region memory data structure; and
placing the overlapping region memory data structure into a printer memory data structure.

21. A system comprising:
a first hardware-implemented means for:

receiving print data defining a plurality of print objects, the print objects having a transparency value, and determining a plurality of overlapping transparent objects from the plurality of print objects;

a second hardware-implemented means for creating an atomic region from the plurality of overlapping transparent objects;

a third hardware-implemented means for:

reading printer characteristic data comprising data defining operating characteristics of a printer, creating a plurality of object raster buffers by rasterizing, using the printer characteristic data, the overlapping region of each overlapping transparency interacting object creating an object raster buffer associated with the respective overlapping transparency interacting object, and subsequent to the creating of the plurality of object raster buffers, blending the plurality of object raster buffers into an overlapping region memory data structure; and a fourth hardware-implemented means for placing the atomic region raster buffer into a printer raster buffer.

* * * * *

UNITED STATES PATENT AND TRADEMARK OFFICE
CERTIFICATE OF CORRECTION

PATENT NO. : 7,969,604 B2  Page 1 of 1
APPLICATION NO. : 11/291177
DATED : June 28, 2011
INVENTOR(S) : Dejan Markovic It is certified that error appears in the above-identified patent and that said Letters Patent is hereby corrected as shown below:

In column 12, line 50, in Claim 20, delete "transparency" and insert -- transparent --, therefor.

In column 12, line 53, in Claim 20, delete "transparency" and insert -- transparent --, therefor.

Signed and Sealed this
Twenty-third Day of August, 2011

David J. Kappos
*Director of the United States Patent and Trademark Office*